(12) United States Patent
Floessholzer

(10) Patent No.: US 12,364,361 B2
(45) Date of Patent: Jul. 22, 2025

(54) AIR-BASED FRYER AND ACCESSORY FOR AN AIR-BASED FRYER

(71) Applicant: KONINKLIJKE PHILIPS N.V., Eindhoven (NL)

(72) Inventor: Hannes Uwe Floessholzer, St. Paul (AT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1020 days.

(21) Appl. No.: 15/733,908

(22) PCT Filed: Jun. 10, 2019

(86) PCT No.: PCT/EP2019/065073
§ 371 (c)(1),
(2) Date: Dec. 1, 2020

(87) PCT Pub. No.: WO2019/238605
PCT Pub. Date: Dec. 19, 2019

(65) Prior Publication Data
US 2021/0219777 A1    Jul. 22, 2021

(30) Foreign Application Priority Data
Jun. 11, 2018  (EP) .................................... 18177066

(51) Int. Cl.
*A47J 37/06* (2006.01)
*A21D 13/41* (2017.01)

(52) U.S. Cl.
CPC ....... *A47J 37/0641* (2013.01); *A47J 37/0664* (2013.01); *A21D 13/41* (2017.01)

(58) Field of Classification Search
CPC .......................... A47J 37/0664; A47J 37/0641
See application file for complete search history.

(56) References Cited

U.S. PATENT DOCUMENTS

| | | |
|---|---|---|
| 4,176,591 A | 12/1979 | Power |
| 4,345,516 A | 8/1982 | Sinclair |
| 4,367,243 A | 1/1983 | Brummett |
| 4,622,231 A * | 11/1986 | Swartley ................ A23L 5/12 426/523 |
| 4,728,762 A | 3/1988 | Roth |

(Continued)

FOREIGN PATENT DOCUMENTS

| | | |
|---|---|---|
| CN | 102973096 A | 3/2013 |
| CN | 104983318 A | 10/2015 |

(Continued)

OTHER PUBLICATIONS

International Search Report and Written Opinion Dated Jul. 19, 2019 for International Application No. PCT/EP2019/065073 Filed Jun. 10, 2019.

(Continued)

*Primary Examiner* — Sean M Michalski
(74) *Attorney, Agent, or Firm* — Maschoff Brennan

(57) ABSTRACT

An accessory is provided for an air-based fryer, and an air-based fryer having the accessory, the accessory having a perforated base with an open side. A handle is provided for mounting the perforated base in a cooking chamber of the air-based fryer, with the perforated base suspended above a base of the cooking chamber.

15 Claims, 4 Drawing Sheets

(56) References Cited

U.S. PATENT DOCUMENTS

| | | | | |
|---|---|---|---|---|
| 4,817,509 | A * | 4/1989 | Erickson | A47J 37/0641 219/400 |
| 5,012,071 | A | 4/1991 | Henke | |
| 5,206,045 | A * | 4/1993 | Stuck | A47J 37/01 426/243 |
| 5,355,868 | A * | 10/1994 | Haen | A47J 37/0786 126/41 R |
| 5,699,722 | A * | 12/1997 | Erickson | A23L 5/17 126/39 M |
| 6,640,695 | B2 * | 11/2003 | Stark | A47J 37/0786 99/422 |
| 7,861,705 | B2 * | 1/2011 | Hulsey | A47J 37/07 432/177 |
| 8,299,404 | B2 * | 10/2012 | Van Der Weij | F24C 15/322 219/400 |
| 9,016,191 | B2 * | 4/2015 | Krolick | F24B 1/003 99/447 |
| 2003/0145740 | A1 * | 8/2003 | Stark | A47J 37/0786 99/447 |
| 2004/0253348 | A1 * | 12/2004 | Woodward | A47J 37/01 426/94 |
| 2008/0206420 | A1 * | 8/2008 | McFadden | A23L 5/17 219/385 |
| 2009/0199839 | A1 * | 8/2009 | Hulsey | A47J 37/07 126/25 A |
| 2010/0089247 | A1 * | 4/2010 | Yang | A47J 37/1209 99/403 |
| 2011/0256285 | A1 * | 10/2011 | De' Longhi | A47J 37/0641 99/341 |
| 2013/0043695 | A1 | 2/2013 | Chapin | |
| 2016/0120363 | A1 | 5/2016 | Zwanenburg | |
| 2017/0231430 | A1 * | 8/2017 | Moon | A47J 37/1266 99/331 |
| 2017/0238760 | A1 | 8/2017 | Fagg | |
| 2017/0245686 | A1 * | 8/2017 | Man | A47J 37/1257 |
| 2017/0251874 | A1 * | 9/2017 | Sladecek | A47J 37/0641 |
| 2019/0082885 | A1 * | 3/2019 | Te Velde | A47J 37/0641 |
| 2020/0268189 | A1 * | 8/2020 | Anthony | A47J 27/002 |
| 2021/0161151 | A1 * | 6/2021 | Thorogood | F24C 15/027 |
| 2022/0097924 | A1 * | 3/2022 | Bontrager | B65D 25/24 |
| 2022/0142402 | A1 * | 5/2022 | Staun | A47J 37/0641 |
| 2022/0404034 | A1 * | 12/2022 | Shimel | A47J 27/004 |
| 2024/0389794 | A1 * | 11/2024 | Iisaka | A47J 37/0664 |

FOREIGN PATENT DOCUMENTS

| | | |
|---|---|---|
| CN | 206371935 U | 8/2017 |
| KR | 200207275 Y1 | 12/2000 |
| WO | 2007/144432 | 12/2007 |
| WO | 2015/176973 | 11/2015 |
| WO | 2017/001191 | 1/2017 |
| WO | 2017097790 A1 | 6/2017 |
| WO | 2017/199197 | 11/2017 |
| WO | 2017/215988 | 12/2017 |

OTHER PUBLICATIONS

The Companion Group, Pizzacraft Catelog 2016.
Philips, Airfryer XL Baking plate, 2016.
Update International Pizza Screen, 10 Inch, Silver https://www.amazon.com/Update-International-PS-10-Pizza-Screen/dp/B0029SVRIA/ref=sr_1_6?s=home-garden&ie=UTF8&qid=1523009861&sr=1-6&keywords=pizza+pan+10+inch.
Gotham Steel Round Copper Air Fry Crisper Tray, Pizza & Baking Pan https://www.wayfair.com/kitchen-tabletop/pdp/gotham-steel-gotham-steel-round-copper-air-fry-crisper-tray-pizza-baking-pan-2-piece-set-gtst1085.html.

* cited by examiner

AIR-BASED FRYER AND ACCESSORY FOR AN AIR-BASED FRYER

CROSS REFERENCE TO RELATED APPLICATIONS

This application is the U.S. National Phase application under 35 U.S.C. § 371 of International Application No. PCT/EP2019/065073 filed Jun. 10, 2019, which claims the benefit of European Patent Application Number 18177066.0 filed Jun. 11, 2018. These applications are hereby incorporated by reference herein.

FIELD OF THE INVENTION

The present invention relates to an air-based fryer.

BACKGROUND OF THE INVENTION

Air-based fryers are known, for instance from WO 2007/144432.

Typically, they comprise a cooking chamber and an air-permeable basket for supporting food ingredients to be cooked. The basket defines a food receiving chamber. A flow of hot air is circulated around and through the food ingredients in the food receiving chamber with relatively high speed, providing the heat needed to cook the food. Thus, the food can be cooked in a healthy manner, with no or much less fat compared to conventional deep-fat frying.

Air-based fryers can be used for preparing a large variety of food ingredients. The general operation involves placing the food items in a basket with a perforated base, so that air can flow through the food from beneath. The base may be removable from the remainder of the basket for easy cleaning.

It would be desirable to be able to cook a greater variety of food types in an air-based fryer.

It is known to provide a cooking pot accessory which can be inserted into the cooking chamber so that food items with a liquid content can be cooked. It is also known to provide a grill pan accessory. This comprises a base with a ridged or otherwise profiled surface, which is used to provide a grilled appearance, such as stripes, to the food. It is typically used for cooking meat.

None of these known accessories are suitable for cooking pizza, for example frozen pizza. Cooking of a pizza requires particular attention to the heating of the bottom surface, and for this reason simply placing the pizza in the basket, or alternatively on a grill pan accessory, does not give the required cooking results.

There is therefore a need for an air-fryer accessory which is suitable for cooking pizza.

WO 2015/176973, WO 2017/001191 and WO 2017/215988 each disclose vessel designs for an air-fryer which aim

SUMMARY OF THE INVENTION

The invention is defined by the claims.

According to examples in accordance with an aspect of the invention, there is provided an accessory for an air-based fryer, comprising:

an air permeable perforated base with an open side around at least 200 degrees, wherein the perforated base comprises a mounting for supporting a pizza for cooking in the air-based fryer, wherein the open side is for allowing air to flow around the outer crust of the pizza; and a handle for mounting the perforated base in a cooking chamber of the air-based fryer, with the perforated base suspended above a base of the cooking chamber.

This accessory has a perforated base, for example in the form of a grid or mesh, on which a pizza can be mounted. The grid allows air to flow to the pizza base. The suspension above the cooking chamber base allows sufficient air to flow to cook the pizza base. The open side allows air to flow around the outer crust of the pizza.

By "open side" is meant there is no side wall around the outer edge of the perforated base, for at least the 200 degrees. This means air is able to flow over and around the edge of the pizza resting on the perforated base. There may for example only be a side wall where the handle connects to the perforated base. This connection area may extend to much less than the remaining 160 degrees, for example less than 100 degrees. Preferably, the connection area is minimized so that the open side can be more than 300 degrees, more preferably can be close to 350 degrees. In this way, air may flow over and around almost the entire edge of the pizza.

The perforated base is for example non-circular, with two diagonals and four sides between the diagonals, wherein the handle comprises two connectors for connecting to the perforated base at two locations in the vicinity of two adjacent diagonals.

The term "diagonal" is used to denote a line which passes through the center of area, which has a locally maximum length. Thus, it does not imply a polygon with straight sides. By way of example, the perforated base may have a generally square shape with rounded corners, and more gently curved sides. The diagonals are then between the rounded corners. By connecting the handle to the corners (i.e. in the vicinity of one end of each of the two diagonals) these connections do not reduce the maximum circular pizza size that can be fitted, since this is constrained by the distance between the sides rather than the diagonals.

The handle may comprise an opening between the two connectors in the vicinity of one of the sides. This opening ensures that the handle does not contribute to a limitation to the maximum pizza size. It means the handle has a double shafted connection to the perforated base. A pizza may project into the opening to maximize the pizza size that can fit.

The perforated base preferably has a minimum diameter of at least 20 cm, for example at least 26 cm. The term "diameter" is used to denote the length of any line which passes through the center of area between opposite sides (or corners). It does not imply a circular shape.

This minimum diameter means that a standard size circular pizza of 20 cm diameter for a small design of appliance, and 26 cm diameter for a larger design of appliance, is able to fit on the perforated base.

The perforated base is preferably removable from the handle, e.g. for easy cleaning.

The accessory may further comprise a top plate mountable above the perforated base and supported by the handle. This top plate may be used to protect a heating element above the cooking chamber from being contacted by light weight food items on the pizza which may be lifted by the air flows. It may also be used to adjust the air flow dynamics in the cooking chamber, for example reducing the airflow directly above the pizza.

The top plate may comprise a solid plate or a perforated plate. A smaller solid plate may be used or a larger perforated plate, again for example in the form of a mesh or grid. A grid may for example have a combined area of openings which is at least 50% of the total area. The holes should have a small size to act as a filter, for example with a diameter less than 1 cm.

The top plate may for example be mountable with a maximum height of at least 7 cm above the perforated base. This allows a thick pizza to be mounted between the perforated base and the top plate. The handle may be arranged to support the top plate at various heights above the base plate. Thus, a user may adjust the height between the perforated base and top plate to the height of the pizza or, more generally, the food to be accommodated in the accessory.

The top plate for example has a maximum diameter of at least 15 cm. In the case of a grid, it may have the same size and shape as the perforated base.

The top plate is preferably also removable from the handle, e.g. for cleaning.

The invention also provides an air-based fryer, comprising:
 a cooking chamber;
 a food receiving unit adapted to be removably received in the cooking chamber such that an air passage is formed all around the food receiving unit;
 a heater for heating air in the cooking chamber; and
 a fan for circulating a flow of hot air in the cooking chamber through the air passage around the food receiving unit,
 wherein the food receiving unit comprises an accessory as defined above.

This air fryer has an accessory for cooking pizzas, which provides the required air flow to the base, sides and top of the pizza. The handle of the accessory may function both to position the accessory within the cooking chamber and also to insert and remove the cooking chamber from a main body of the air-based fryer.

The perforated base is for example mounted at least 1.5 cm above the base of the cooking chamber. This provides a sufficient air flow beneath the pizza base to provide desired cooking of the pizza base.

The air-based fryer may comprise a food receiving chamber for use as the food receiving unit in place of the accessory, wherein the food receiving chamber comprises a base, and a side wall, wherein the base of the food receiving chamber is interchangeable with the perforated base of the accessory.

This food receiving chamber may be the normal basket of the air-based fryer. The bottom of the basket may thus be reused as the pizza perforated base. In this way, only the handle is needed to implement the pizza accessory, in addition to the normal components of the air-based fryer.

When the accessory further comprises a top plate, the base of the food receiving chamber may be interchangeable with the top plate of the accessory. Thus, the perforated base of the accessory may be specially designed, and the top plate is reused from the basket.

The top plate, perforated base and basket base may all be identical so that the fitting is made easier for the user, in that they cannot select the wrong component.

Thus, a versatile set of options is created with shared components.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
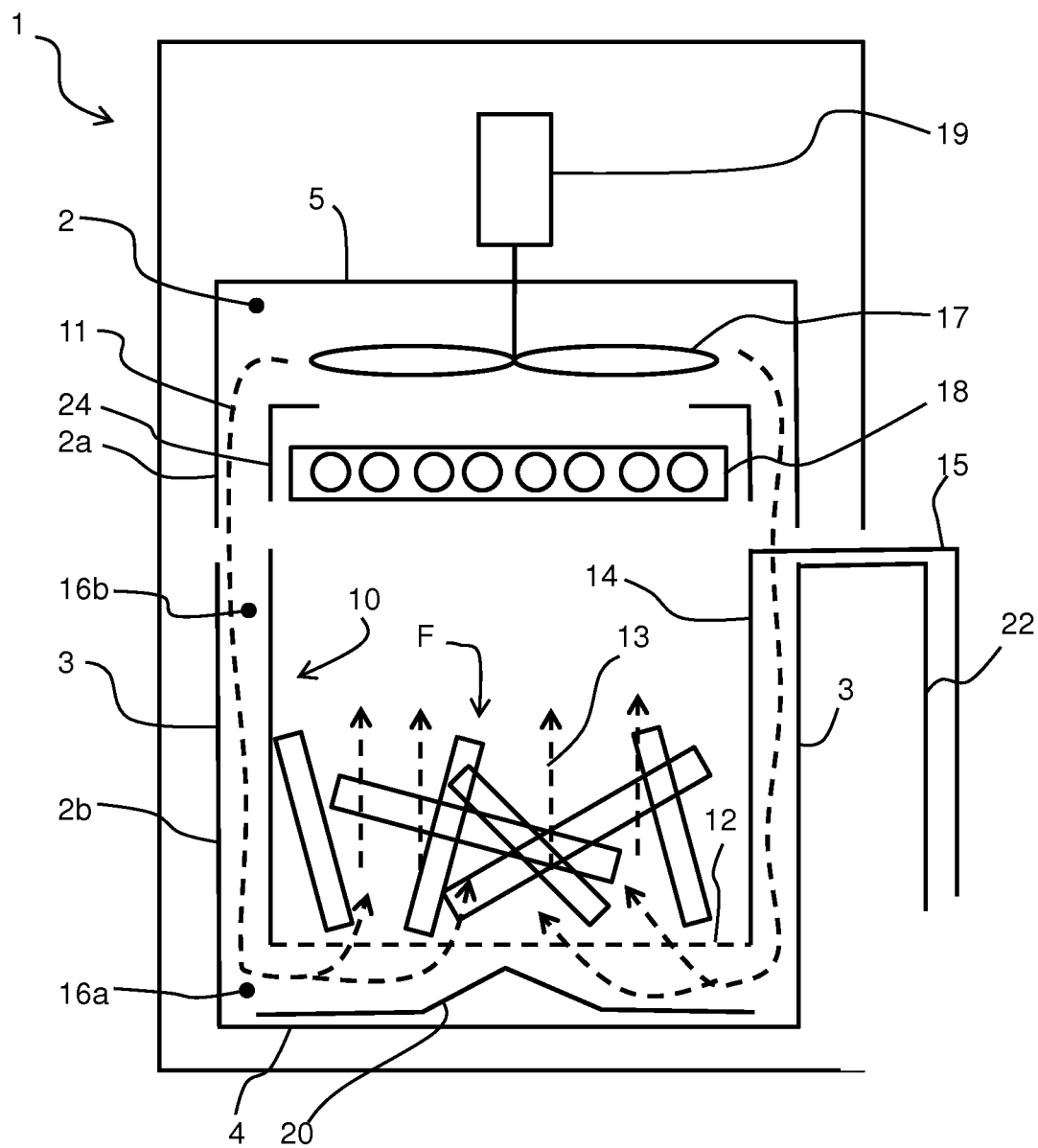
FIG. 1 shows a known design of air-based fryer in cross-sectional view.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides an accessory for an air-based fryer (and the air-based fryer with the accessory) which comprises a perforated base with an open side and a handle for mounting the perforated base in a cooking chamber of the air-based fryer, with the perforated base suspended above a base of the cooking chamber. This accessory is suitable for cooking pizzas, although it may be used for other food products such as toasted sandwiches or other bread based food products. The reference to pizzas are thus for ease of description and are not intended to be limited.

FIG. 1 shows a known design of air-based fryer 1 in cross-sectional view. The air-based fryer 1 comprises a cooking chamber 2 with sidewalls 3, a bottom wall 4 and a top wall 5. A basket 10 is disposed within the cooking chamber 2 to support food F to be cooked.

The basket 10 comprises an air-permeable bottom 12 and solid side walls 14. It has an open top, although a permeable cover plate may also be provided. The bottom 12 for example comprises a wire mesh which is a snap fit into the base of the basket within the side walls 14. The wire mesh is for example removable for cleaning, e.g. in a dishwasher, whereas the remainder of the basket is typically wiped clean by the user. A mounting structure 15 is provided to detachably mount the basket 10 in the cooking chamber 2. The mounting structure 15 is designed to allow air to circulate all around the basket 10 in the mounted condition. The mounting structure 15 is designed such that in mounted condition a bottom gap 16a is provided between the air-permeable bottom 12 and the bottom wall 4 of the cooking chamber 2. Furthermore, a lateral gap 16b is provided between the sidewalls 3 of the cooking chamber 2 and the perimeter of the air-permeable bottom 12. The bottom gap 16a and lateral gap 16b together form part of an air circulation channel.

The mounting structure 15 is designed to minimize obstruction of said air circulation channel.

In some embodiments, as illustrated in FIG. 1, the mounting structure 15 comprises a handle, with which the basket 10 may be suspended from a sidewall 3 of the cooking chamber 2. The handle allows a user to easily remove the basket 10 from the cooking chamber 2.

The air-based fryer 1 further comprises an air circulation system comprising a fan 17, a motor 19 and an air heater 18 for circulating hot air in the cooking chamber 2. The air heater 18 may be disposed above the basket 10. In such a case, the air heater 18 may radiate heat directly to the food ingredients F in addition to heating the air in the cooking chamber 2.

The air circulation system may also be disposed above the basket 10 for example above the air heater 18.

The air circulation system is designed to pass hot air through the air-permeable bottom 12 of the basket 10 such that food F disposed thereon will be prepared by a through-streaming of hot air.

The air circulation system in this example is designed to draw air upward through the basket 10 as shown by arrows 13. The air may subsequently be passed along the air heater 18 to heat the air. The air heater 18 may be any appropriate heating source, such as an electric heater which can heat air to, for example, between roughly 100° C. and 250° C. by controlling the power supplied to the air heater.

As shown by arrows 11, the air circulation system is designed to pass hot air downward along an inner surface of the cooking chamber 2 and an outer surface of the basket 10. The bottom gap 16a and lateral gap 16b together form an air circulation channel for guiding the flow of hot air from the air circulation system to the bottom 12 of the basket 10.

The bottom wall 4 of the cooking chamber 2 may be flat or as shown in FIG. 1 the bottom wall 4 may be provided with an air guide member 20 configured to direct the hot air flow towards and/or through the air-permeable bottom 12 of the basket 10.

The air guide member 20 may have a substantially conical, or frusto-conical outer contour or it may comprise ribs or arms. The air guide member 20 may be integrally formed in the bottom wall 4 of the cooking chamber or be provided as a separate insert.

In the example shown, a deflector plate 24 is provided in an upper part of the cooking chamber 2 above the basket 10, to further enclose a volume enclosed by the basket 10, and to help guiding air from the air circulation system 6 around the basket into the air circulation channel formed by the bottom gap 16a and lateral gap 16b.

The cooking chamber 2 is shown with an upper section 2a and a lower section 2b, separable from each other to enable access into the cooking chamber 2. The upper section 2a thus functions as a cooking chamber lid. In some embodiments, the lower section 2b may be arranged stationary and the upper section 2a may be releasably or hingedly arranged, e.g. in the form of a lid. In some embodiments, the upper section 2a may be arranged stationary and the lower section 2b may be releasably arranged, e.g. in the form of a drawer. In such case, the lower section 2b may comprise a handle 22 to aid removal of the lower section 2b from the air-based fryer 1, as illustrated in FIG. 1. The mounting structure, more particularly, the handles 15 may couple together with handle 22 to define a single handle for the user to manipulate.

The air-based fryer 1 may comprise a vent (not shown), defining an air outlet from the cooking chamber 2 to outside the air-based fryer 1.

In use, a variety of food types may be prepared in the air-based fryer 1. In case where the food is a bulk type of food, the individual food ingredients F may form a pile as illustrated in FIG. 1, with the height, density and consequently the flow resistance being highest in the center of the pile and decreasing towards the periphery.

The bottom 12 of the basket 10 may for example be designed to have a flow resistance that reversely mirrors the flow resistance of the pile, so is lowest in the center and increases towards the periphery. Thus, the total flow resistance of the bottom 12 and pile together may be more or less constant over the entire cross section of the basket 10, resulting in a more homogeneous air flow through the basket 10 and, ultimately, in more homogeneous cooking results.

The invention provides an accessory for an air-based fryer, and an air-based fryer having the accessory, the accessory having a perforated base with an open side. A handle is provided for mounting the perforated base in a cooking chamber of the air-based fryer, with the perforated base suspended above a base of the cooking chamber. Thus, the handle functions as the mounting structure 15 of FIG. 1. The handle may cooperate with a handle 22 of the cooking chamber to define a single handle for the user to manipulate, as described above. Alternatively, the handle of the accessory may function, in mounted condition, as handle for manipulating the cooking chamber itself.

Figure 2:
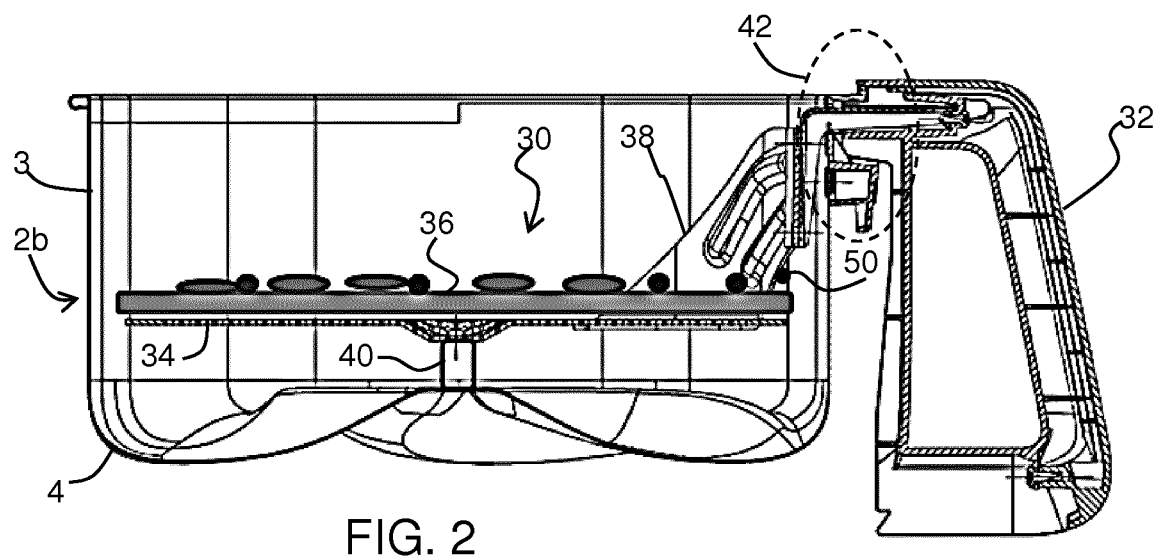
FIG. 2 shows an example of the lower section of the cooking chamber with an accessory suspended by its handle above the base of the cooking chamber.

FIG. 2 shows an example of the lower section 2b of the cooking chamber with the accessory 30 suspended by its handle 32 above the base 4 of the cooking chamber. The handle 32 supports a perforated base 34 on which a food item 36 such as a pizza may be placed.

The perforated base 34 is open all around, and thus comprises a generally planar support plate. It is removably attached to the handle 32 by a connection arrangement 38. This connection arrangement 38 creates a local side wall portion, but it is sufficiently narrow that the remaining area around the perforated base is open around at least 200 degrees. The outer edge of the perforated base is spaced from the inner wall of the inner sidewalls 3 of the cooking chamber 2. For example, the spacing around the outer edge (i.e. around the open region of the perforated base) when the accessory is in position within the cooking chamber may be at least 5 mm, or at least 10 mm.

The perforated base may be fully supported by the handle, or there may be a support element 40 so that the perforated base also rests on the base 4 of the cooking chamber. The perforated base is for example mounted at least 1.5 cm above the base of the cooking chamber, for example 2 cm above, for example in the range 1.5 cm to 5 cm above the base.

The handle 32 supports the perforated base 34 and it also clips to the lower part 2b of the cooking chamber, for example at the connection area 42. Thus, a single handle 32 is used to hold the lower part of the cooking chamber and the perforated base as a single connected unit.

Figure 3:
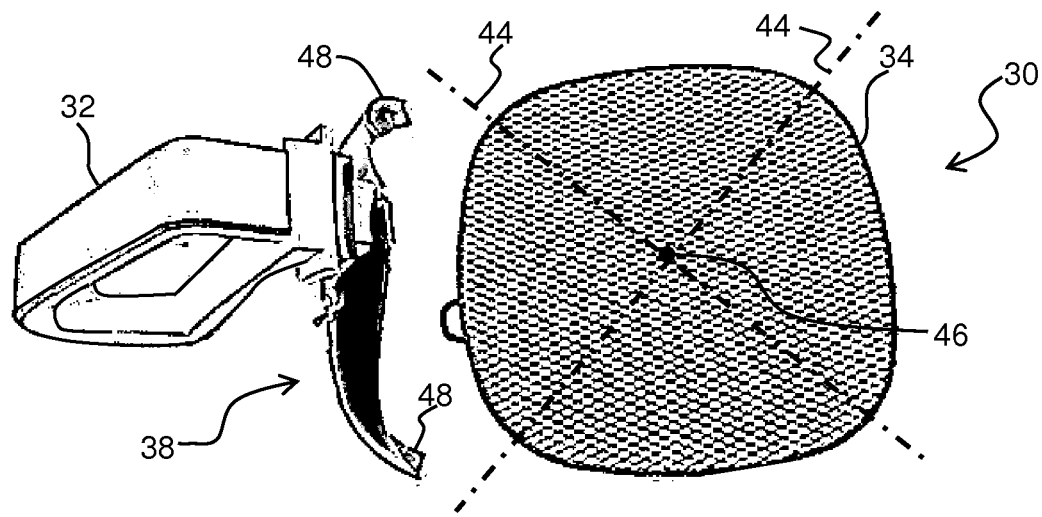
FIG. 3 shows the accessory with the perforated base and the handle separated.

FIG. 3 shows the perforated base 34 and the handle 32 separated. The perforated base 34 has the same shape as the outer contour of the cooking chamber. This is for example generally square with sharply rounded corners and gently curved sides. It thus has two diagonals 44 and four sides between the diagonals. The diagonal is a locally maximum width passing through the center of area 46.

The connection arrangement comprises two connectors 48 for connecting to the perforated base at two adjacent corners. By connecting at regions of locally maximum diameter, the circular pizza size which can be fitted on the perforated base is not reduced by the connection arrangement 38.

The handle comprises an opening 50 (most clearly seen in FIG. 5) between the two connectors 48.

The perforated base preferably has a minimum diameter (e.g. from the middle of one side to the middle of an opposing side) of at least 20 cm in one example and at least 26 cm in another example. Standard sizes of circular pizza of 20 cm or 26 cm diameter are thereby able to fit on the perforated base.

Figure 4:
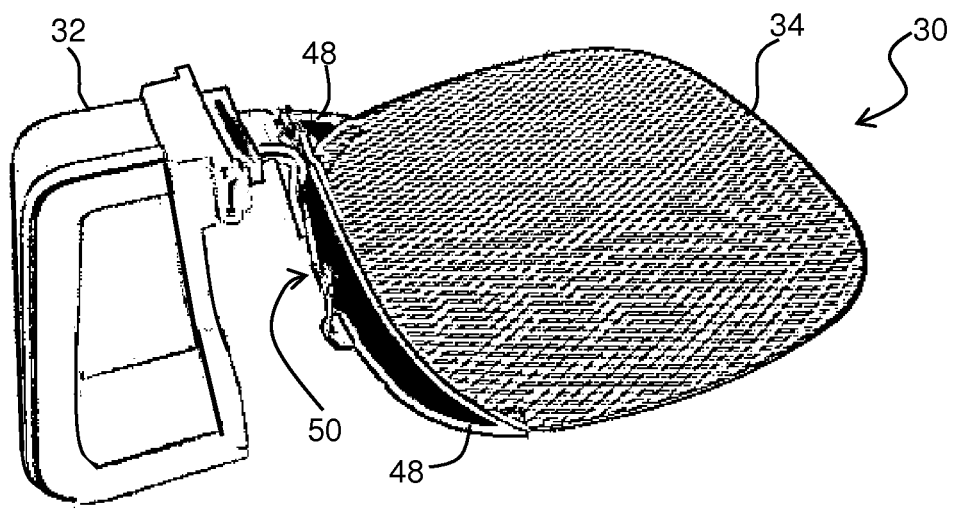
FIG. 4 shows the accessory with the perforated base connected to the handle.

FIG. 4 shows the perforated base 34 connected to the handle 32. It can then be clipped over the outer wall of the lower portion 2b of the cooking chamber to create the connected assembly of FIG. 2.

Figure 5:
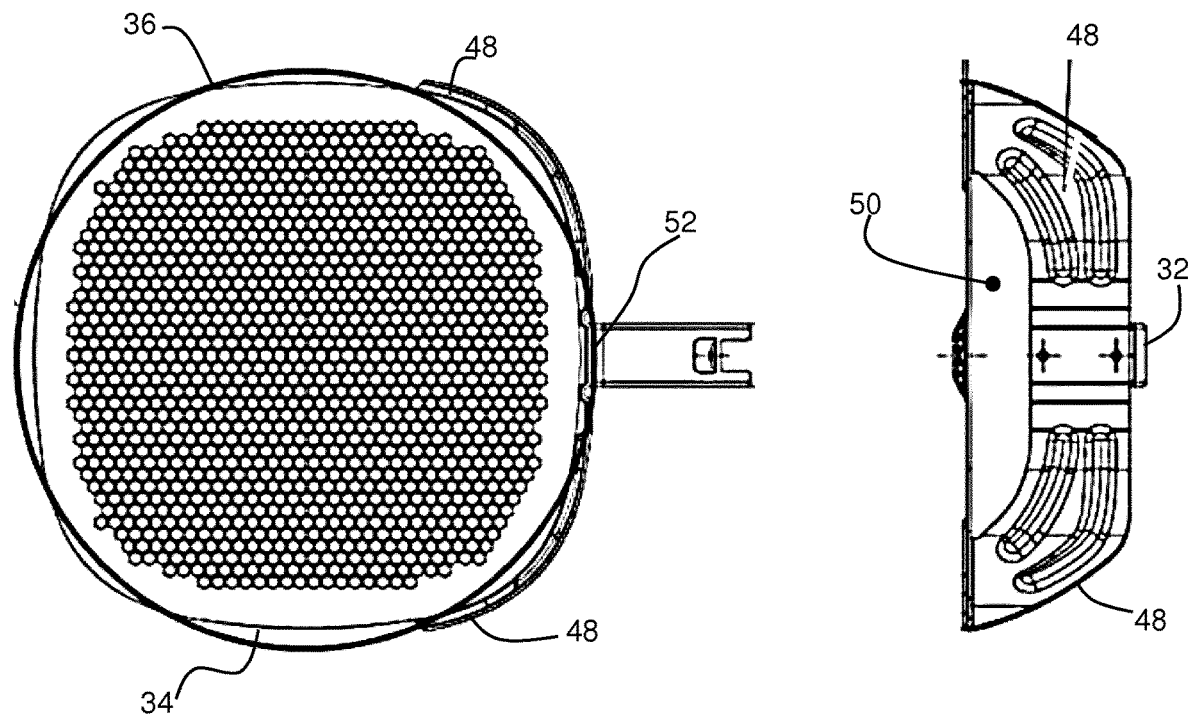
FIG. 5 shows the accessory in plan view and in end view.

FIG. 5 shows the accessory and lower portion of the cooking chamber in plan view on the left and in end view on the right. It shows the pizza 36 as circular. It also shows that a part 52 of the pizza extends through the opening 50 so that the handle and its connection to the perforated base does not impact the maximum pizza size. It also shows that the pizza may overlap the perforated base where the perforated base has its narrowest diameter. Thus, the pizza may be slightly larger than the minimum diameter of the perforated base.

Figure 6:
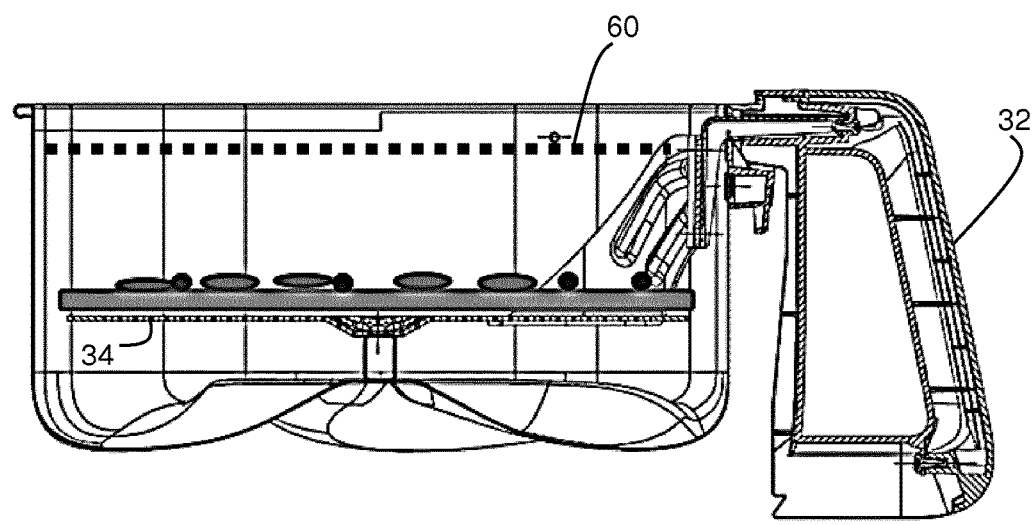
FIG. 6 shows a modification to the design of FIG. 2 in which a top plate mounted above the perforated base.

FIG. 6 shows a modification to the design of FIG. 2 in which a top plate 60 is mounted above the perforated base 34 and supported by the handle 32. This top plate may be used to protect the heating element 18 (FIG. 1) above the cooking chamber from being contacted by light weight food items on the pizza which may be lifted by the air flows. It may also be used to adjust the air flow dynamics in the cooking chamber, for example reducing the airflow directly above the pizza.

The top plate may comprise a solid plate or another perforated plate. A smaller solid plate may be used or a larger grid plate. A grid may for example have a combined area of openings which is at least 50% of the total area. The holes should have a small size to act as a filter to any small food items which have become caught in the air flow, for example with a diameter less than 1 cm.

Figure 7:
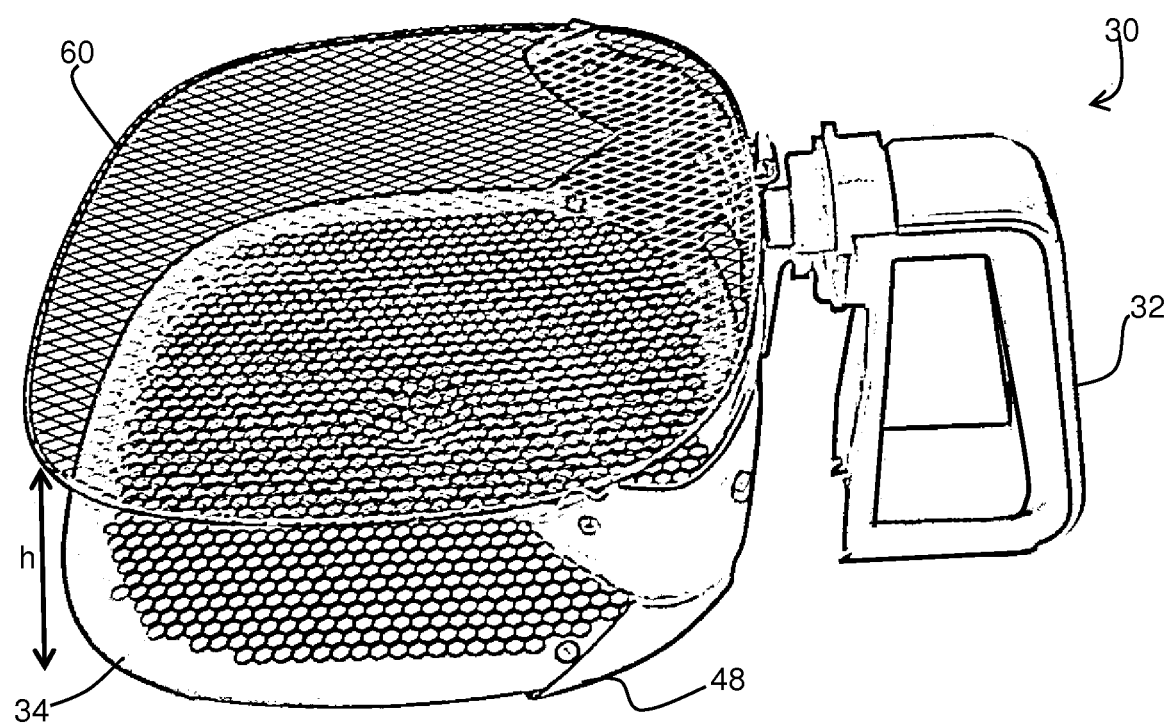
FIG. 7 shows the assembly of the handle, perforated base and top plate in perspective view.

FIG. 7 shows the assembly of the handle 32, perforated base 34 and top plate 60 in perspective view. The top plate may be mountable at different heights above the perforated base, for example in steps of between 1 cm and 2 cm. A set of attachment features may for example be provided at different heights, and the top plate may be mounted to any chosen one of these attachment features. The top plate is for example mounted with a maximum height h of at least 7 cm above the perforated base. This allows a thick pizza to be mounted between the perforated base and the top plate.

The top plate for example has a maximum diameter of at least 15 cm. In the case of a grid, it may have the same size and shape as the perforated base as shown in FIG. 7.

An air-based fryer generally includes the basket as the main cooking chamber accessory. The basket has a removable bottom part, for cleaning purposes, as mentioned above.

The accessory may make use of the same bottom part. Thus, the perforated base 34 may comprise the bottom part of the main basket. Thus, the basic accessory of FIGS. 3 and 4 may be implemented only with the specially designed handle. The accessory with both top plate and perforated base of FIG. 7 may be implemented only with the specially designed handle and one extra plate to be used as the top plate.

Alternatively, the top plate 60 may be interchangeable with the bottom of the main basket. Thus, the accessory with both top plate and perforated base may be implemented only with the specially designed handle and one extra plate to be used as the perforated base.

As a further alternative, the top plate and the perforated base may be identical. This makes assembly easier.

Thus, a versatile set of options is created with shared components.

The invention may be applied to different types of air-based fryer, of which FIG. 1 is only one example.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An accessory for an air-based fryer, comprising:
   an air permeable perforated base with an open side around at least 200 degrees, wherein the open side of the air permeable perforated base allows air to flow around an outer crust of a pizza mountable on the air permeable perforated base;
   a handle connected to the air permeable perforated base, wherein the air permeable perforated base is suspended, by the handle, above a base of a cooking chamber of the air-based fryer, and wherein a lateral gap is provided between a perimeter of the air permeable perforated base and side walls of the cooking chamber; and
   a top plate mountable above the air permeable perforated base, wherein the top plate reduces the air flow directly above the pizza, in the cooking chamber.

2. The accessory of claim 1, wherein the handle comprises two connectors and an opening there between.

3. The accessory of claim 2, wherein the air permeable perforated base is non-circular, with two diagonals and four sides between the diagonals, wherein the two connectors are arranged for connecting the handle to the air permeable perforated base at two locations in the vicinity of two adjacent diagonals.

4. The accessory of claim 1, wherein the air permeable perforated base is removable from the handle.

5. The accessory of claim 1, wherein the air permeable perforated base has a minimum diameter of at least 20 cm.

6. The accessory of claim 1, wherein the top plate is supported by the handle.

7. The accessory of claim 1, wherein the top plate comprises a solid plate or a perforated plate.

8. The accessory of claim 1, wherein the top plate comprises a grid having a combined area of openings which is at least 50% of the total area.

9. The accessory of claim 1, wherein the handle supports the top plate, at the selection of a user, at various heights above the air permeable perforated base.

10. The accessory of claim 6, wherein the top plate is mountable with a maximum height of at least 7 cm above the air permeable perforated base.

11. The accessory of claim 1, wherein the top plate is removable from the handle.

12. An air-based fryer, comprising:
a cooking chamber;
a food receiving unit adapted to be removably received in the cooking chamber such that an air passage is formed all around the food receiving unit;
a heater for heating air in the cooking chamber; and
a fan for circulating a flow of hot air in the cooking chamber through the air passage around the food receiving unit,
wherein the food receiving unit comprises an accessory of claim 1.

13. The air-based fryer of claim 12, wherein the air permeable perforated base is mounted at least 1.5 cm above the base of the cooking chamber.

14. The air-based fryer of claim 12, further comprising a food receiving chamber for use as a second food receiving unit, wherein the food receiving chamber comprises a side wall, and wherein the air permeable perforated base of the accessory is configurable as a base of the food receiving chamber, such that the base of the food receiving chamber is interchangeable with the air permeable perforated base on the accessory.

15. The air-based fryer of claim 14, wherein the accessory further comprises a top plate, wherein the base of the food receiving chamber is interchangeable with the top plate of the accessory.

* * * * *